US011468222B2

(12) United States Patent
Kandel et al.

(10) Patent No.: US 11,468,222 B2
(45) Date of Patent: Oct. 11, 2022

(54) STOCHASTIC SIGNAL PREDICTION IN COMPACT MODELING

(71) Applicant: Synopsys, Inc., Mountain View, CA (US)

(72) Inventors: Yudhishthir Prasad Kandel, Durham, NC (US); Lawrence S. Melvin, III, Hillsboro, OR (US)

(73) Assignee: Synopsys, Inc., Mountain View, CA (US)

( * ) Notice: Subject to any disclaimer, the term of this patent is extended or adjusted under 35 U.S.C. 154(b) by 0 days.

(21) Appl. No.: 17/182,135

(22) Filed: Feb. 22, 2021

(65) Prior Publication Data
US 2021/0263404 A1    Aug. 26, 2021

Related U.S. Application Data

(60) Provisional application No. 62/980,913, filed on Feb. 24, 2020.

(51) Int. Cl.
*G06F 30/30*        (2020.01)
*G06F 30/398*       (2020.01)
(Continued)

(52) U.S. Cl.
CPC ............ *G06F 30/398* (2020.01); *G03F 7/705* (2013.01); *G03F 7/70625* (2013.01);
(Continued)

(58) Field of Classification Search
None
See application file for complete search history.

(56) References Cited

U.S. PATENT DOCUMENTS 7,378,202 B2 *  5/2008  Granik ................... G03F 1/68
                                                  430/30
8,849,008 B2    9/2014  Zhou et al.
(Continued)

FOREIGN PATENT DOCUMENTS

WO    WO-2021062040 A1 *  4/2021  ............... G03F 1/70

OTHER PUBLICATIONS

J. J. Biafore et al., "Statistical simulation of resist at EUV and ArF," Proc. SPIE 7273, Advances in Resist Materials and Processing Technology XXVI, SPIE Advanced Lithograph, 2009, 11 pages. (Year: 2009).*

(Continued)

*Primary Examiner* — Leigh M Garbowski
(74) *Attorney, Agent, or Firm* — Weaver Austin Villeneuve & Sampson LLP

(57) ABSTRACT

A method, includes, in part, defining a continuous signal, defining a threshold value, calibrating the continuous signal and the threshold value from measurements made on edges of one or more patterns on a mask and corresponding edges of the patterns on a wafer, convolving the continuous signal with a kernel to form a corrected signal, and establishing, by a processor, a probability of forming an edge at a point along the corrected signal in accordance with a difference between the value of the corrected signal at the point and the calibrated threshold value. The kernel is calibrated using the same measurements made on the patterns' edges.

20 Claims, 5 Drawing Sheets

(51) Int. Cl.

| | |
|---|---|
| *G03F 7/20* | (2006.01) |
| *G06F 111/08* | (2020.01) |
| *G06F 111/10* | (2020.01) |
| *G06F 119/18* | (2020.01) |
| *G06F 119/22* | (2020.01) |

(52) U.S. Cl.
CPC ....... *G06F 2111/08* (2020.01); *G06F 2111/10* (2020.01); *G06F 2119/18* (2020.01); *G06F 2119/22* (2020.01)

(56) References Cited

U.S. PATENT DOCUMENTS

| | | | |
|---|---|---|---|
| 9,934,346 | B2 | 4/2018 | Hansen |
| 10,599,046 | B2 | 3/2020 | Kim |
| 11,061,373 | B1 | 7/2021 | Khaira et al. |
| 11,079,687 | B2 | 8/2021 | Slachter et al. |
| 2021/0018850 | A1 | 1/2021 | Slachter et al. |
| 2021/0263405 | A1 | 8/2021 | Stanton et al. |
| 2021/0263407 | A1 | 8/2021 | Levinson et al. |
| 2021/0264091 | A1 | 8/2021 | Stanton et al. |

OTHER PUBLICATIONS

D. T. Wintz et al., "Photon flux requirements for extreme ultraviolet reticle imaging in the 22- and 16-nm nodes," J. Micro/Nanolith. MEMS MOEMS vol. 9, No. 4, Oct.-Dec. 2010, 8 pages. (Year: 2010).*

S.-M. Kim et al., "Understanding of stochastic noise," Proc. SPIE 9422, Extreme Ultraviolet (EUV) Lithography VI, SPIE Advanced Lithography, 2015, 12 pages. (Year: 2015).*

P. De Bisschop et al., "Stochastic Printing Failures in EUV Lithography," Proc. SPIE 10957, Extreme Ultraviolet (EUV) Lithography X, SPIE Advanced Lithography, 2019, 21 pages. (Year: 2019).*

R. Jonckheere et al., "Stochastic printing behavior of ML-defects on EUV mask," Proc. SPIE 11147, Int'l Conference on Extreme Ultraviolet Lithography 2019, SPIE Photomask Technology + EUV Lithography, 14 pages. (Year: 2019).*

K. Lucas et al., "Exploration of compact and rigorous simulation-based methods to reduce stochastic failure risk," EUV Workshop, 2019 Synopsys, Inc., pp. 1-23. (Year: 2019).*

M. J. Maslow et al., "Impact of Local Variability on Defect-Aware Process Windows," Proc. SPIE 10957, Extreme Untraviolet (EUV) Lithography X, SPIE Advanced Lithography, 2019, 16 pages. (Year: 2019).*

U.S. Notice of Allowance dated Mar. 16, 2022 issued in U.S. Appl. No. 17/183,291.

U.S. Office Action dated Feb. 1, 2022 issued in U.S. Appl. No. 17/184,521.

U.S. Office Action dated Sep. 28, 2021 issued in U.S. Appl. No. 17/183,291.

P. De Bisschop, "Stochastic effects in EUV lithography: random, local CD variability, and printing failures," J. Micro/Nanolithography, MEMS, MOEMS, vol. 16, No. 4, p. 041013-1-041013-17, Oct.-Dec. 2017.

U.S. Final office Action dated Jun. 17, 2022 in U.S. Appl. No. 17/184,521.

U.S. Notice of Allowance dated Jun. 29, 2022 in U.S. Appl. No. 17/183,291.

* cited by examiner

STOCHASTIC SIGNAL PREDICTION IN COMPACT MODELING

RELATED APPLICATION

The present application claims benefit under 35 USC 119(e) of U.S. Application Ser. No. 62/980,913, filed Feb. 24, 2020, entitled "Stochastic Signal Prediction In Compact Modeling", the content of which is incorporated herein by reference in its entirety.

TECHNICAL FIELD

The present disclosure relates to generating masks used during the fabrication of semiconductor devices, and more particularly to forming a stochastic model in generating such masks.

BACKGROUND

Owing to the discrete nature of atoms and molecules as well as the quantization of light (photon count), at relatively small dimensions of 20 nm and below, the mask sets and associated lithography processes used in manufacturing of semiconductor devices have non-negligible effect on yield loss. For the same optical dose, the impact of the quantization of light in Extreme Ultraviolet Lithography (EUV) lithography systems may be at least 14 times greater than that of the Deep Ultraviolet Lithography (DUV) lithography systems, while at the same time the EUV systems are being increasingly used in printing smaller features, thus further compounding the problem.

SUMMARY

A method of predicting contours of a photoresist edge on a wafer following EUV/DUV exposure and bake, in accordance with one embodiment of the present disclosure, includes, in part, defining a continuous signal, defining a threshold value, calibrating the continuous signal and the threshold value from measurements made on edges of one or more patterns on a mask and corresponding edges of the patterns on a wafer, convolving the continuous signal with a kernel to form a corrected signal, and establishing a probability of forming an edge at a point along the corrected signal in accordance with a difference between the value of the corrected signal at the point and the calibrated threshold value. The kernel is calibrated using the same measurements made on the patterns' edges.

A non-transitory computer readable storage medium includes instructions which when executed by a processor cause the processor to predict contours of a photoresist edge on a wafer following EUV/DUV exposure and bake, the instructions further cause the processor to define a continuous signal, define a threshold value, calibrate the continuous signal and the threshold value from measurements made on edges of one or more patterns on a mask and corresponding edges of the patterns on a wafer, convolve the continuous signal with a kernel to form a corrected signal, and establish a probability of forming an edge at a point along the corrected signal in accordance with a difference between the value of the corrected signal at the point and the calibrated threshold value. The kernel is calibrated using the same measurements made on the patterns' edges.

A system, in accordance with one embodiment of the present disclosure includes, in part, a memory storing instructions, and a processor, coupled with the memory and configured to execute the instructions. The instructions when executed cause the processor to define a continuous signal, define a threshold value, calibrate the continuous signal and the threshold value from measurements made on edges of one or more patterns on a mask and corresponding edges of the one or more patterns on a wafer, convolve the continuous signal with a kernel to form a corrected signal, and establish an edge at a point along the corrected signal in accordance with a difference between a value of the corrected signal at the point and the calibrated threshold value. The kernel is calibrated using the measurements.

BRIEF DESCRIPTION OF THE DRAWINGS

The disclosure will be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

DETAILED DESCRIPTION

Figure 1:
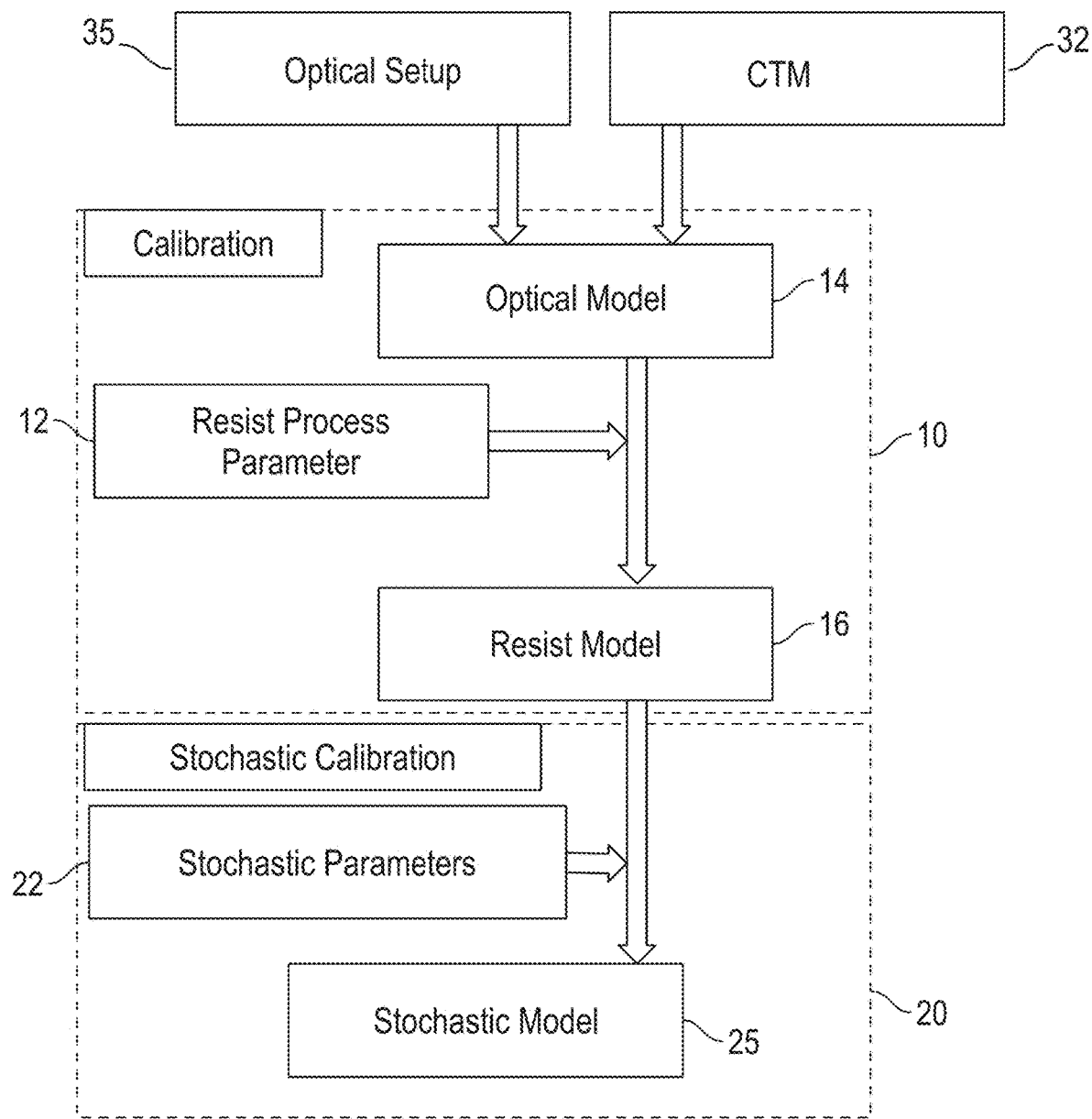
FIG. 1 shows a flow used in stochastic modeling, in accordance with one embodiment of the present disclosure.

Local edge placement uniformity (LEPU), which is a measure of how a given edge is printed on different wafers and different runs of wafers, is a key step in generating masks used to manufacture integrated circuits. One technique for mitigating the error caused by LEPU or local critical dimension uniformity (LCDU), which is a measure of how a CD (such as spacing between two parallel lines or two trenches) is printed on different wafers and different runs of wafers, is to treat the line edge roughness (LER) around a nominal gauge as constant. The LER may be measured directly on a wafer and subsequently used during an optimization step to form a geometrical feature or shape.

In another technique, the LER is treated as being proportional to another quantity that can be measured or computed. For example, normalized image log slope (NILS) may be used as a measure for repeated mask features (lines and spaces, contact holes, repeated cut lines, and the like) to identify areas that are susceptible to mask errors. However, because the NILS technique uses a single number associated with each area that is susceptible to mask errors, the NILS technique is insufficient to mitigate LER.

In accordance with one embodiment of the present disclosure, a continuous function (also referred to herein as signal) is used to define locations of edges of various geometric figures and shapes on a mask. Measured wafer data and/or rigorously computed/simulated LEPU or LCDU values are subsequently used to calibrate the confidence band around the contours of an edge placed using a continuous signal. For example, data collected from a rigorous model simulator or from a critical dimension scanning electron microscope (CD-SEM) may be used to calibrate the confidence band obtained in accordance with embodiments of the present disclosure. As described further below, embodiments of the present disclosure are at least 4 times more accurate than conventional techniques in predicting where an edge is likely to form during a pattern transfer from a mask to a wafer.

Embodiments of the present disclosure may be simplified and made more accurate by including the interaction between the photoresist and the optical source's photon distribution function, referred to herein as the aerial image of the optical source. In one embodiment, an inhibitor concentration field and the developed profile post exposure and bake may further be used as a signal to improve the accuracy.

A process that is repeatable and carried out using the same equipment, as is the case with the lithography process, is stochastic in nature. Embodiments of the present disclosure determine the distribution error in random edge placement by generating models that are also stochastic aware and take such randomness into account. Embodiments of the present disclosure are therefore adapted to assign a confidence interval (band) to edge locations.

Confidence band values determined in accordance with embodiments of the present disclosure may be further used to enhance the accuracy of models such as optical proximity correction (OPC), Source Mask Optimization (SMO), inverse lithography technology (ILT), and the like, and to improve mask patterns and thereby increase yield.

By applying a suitable cost function, embodiments of the present disclosure may further be used to perform defect window centering, compare OPC results against stochastic defect, estimate yield, and the like. Embodiment of the present disclosure may further be used to gain insight into the LCDU variations to further improve ILT models.

FIG. 1 is a high-level view of a process for creating a stochastic model, in accordance with one embodiment of the present disclosure. As shown, during the first calibration phase 10, process parameters of the photoresist 12, such as acid concentration, acid quencher, diffusion activation energy, and molecular size, are used with an optical model 14 to generate a resist model 16. Optical model 14 is shown as being developed in accordance with the parameters of optical setup 35, such as optical attenuation, depth of focus, dose, and characteristics transmission matrix (CTM) data 32. CTM is a look-up table that describes what the output electric field emanating from a mask is for any given input electric field applied to the mask. During the stochastic calibration phase 20, stochastic parameters 22, such as the mean and standard deviation for a Gaussian distribution function, together with resist model 16 are used to generate a stochastic model 25. In other embodiments, stochastic calibration phase 20 is performed using parameters of optical setup 35 and CTM data 32 thereby dispensing the need for calibration phase 10.

As described further below, in accordance with embodiments of the present disclosure, a signal is first generated and a threshold value is defined. For a photoresist with positive tone development (positive photoresist), a signal level above the threshold indicates clearance (i.e., the photoresist is removed), and a signal level below the threshold indicates lack of clearance (i.e., the photoresist is not removed). Conversely, for a photoresist with negative tone development (negative photoresist), a signal level below the threshold indicates clearance, and a signal level above the threshold indicates lack of clearance. The following description of the embodiments of the present disclosure are made with reference to a positive photoresist. It is understood however that embodiments of the present disclosure are equally applicable to a negative photoresist.

A measure, such as median, mode, or other characteristics of the photons present in a light beam may be used to define a first moment of the random distribution of interaction between the light beam and the photoresist. For a light beam characterized by a Poisson distribution function, since the mean number of photons that imping at a location on a wafer or mask is known, in accordance with embodiments of the present disclosure, a confidence band around the location where an edge is likely to form is constructed. The mean number of photons impinging on a mask/wafer is defined, in part, by the applied dose and modulated by the variation in the pattern being formed.

The Poisson distribution is a discrete probability distribution that defines the probability that a given number of events occur in a fixed interval of time or space if the events occur with a known constant mean rate and independently of the time since the last event. The Poisson distribution is used to determine the edge formation in a specified distance or area. The discrete random variable x, shown below in expression (1), has a Poisson distribution with parameter $\lambda > 0$, if for $k = 0, 1, 2 \ldots$, the probability mass function of x is defined by:

$$f(k, \lambda) = Pr(x = k) = \frac{\lambda^k e^{-\lambda}}{k!} \quad (1)$$

where e is Euler's constant (e=2.71828 . . . ), k! is the factorial of k. The positive real number $\lambda$ is equal to the expected value of x.

For example, if a threshold of 0.2 is selected and the open frame dose is 20 photons per square nanometer, then the probability that a region having an area of one nanometer by one nanometer receives fewer or more than the cutoff dose of 4 photons determines the uncertainty of edge formation within that region. If such an edge does not have an infinite slope and a curvature, a finite possibility that the edge will be blurry is missed if correlation effects and confidence bands are not considered.

In accordance with one embodiment of the present disclosure, a signal that is a continuous function of position is used to determine edge positions. The signal, which may be the output of a calibrated continuous model, is represented herein by parameter $\xi$. The constant threshold, which is also obtained from such a calibrated continuous model, is represented herein by parameter Th. For example, measurements made on mask edges that are transferred to a wafer using a photolithographic process to form associated edges on the wafer may be used to calibrate $\xi$ and Th. Such calibration may be achieved using, for example, polynomial functions. Calibration of a test pattern (also referred to herein as gauge) ends and critical dimension (CD) variability, which may also be used to calibrate signal $\xi$ and threshold Th, may be carried out as described below.

First, multiple images of a test pattern (such as critical-dimension scanning-electron micro-scope images) are made at different focal planes associated with a photo-lithographic system (such as an exposure tool) that was used to fabricate the test pattern. Using these images, one or more sets of calibration parameters are determined for at least three different focal planes, for example, by comparing the images to the test pattern or a target image that corresponds to the test pattern. Thereafter, an interpolation function is used to fit to the sets of calibration parameters. The argument of the interpolation function F is the difference between an arbitrary focal plane (which is sometimes referred to as an image plane) and a reference focal plane of the photo-lithographic system ($\Delta f$) normalized to a wavelength $\lambda$ (such as the characteristic wavelength used in the photo-lithographic process and/or a characteristic wavelength used when capturing the images), and the output is the set of calibration parameters Y at the arbitrary focal plane. Thus, the interpolation function may be expressed as:

$$Y = F\left(\frac{\Delta f}{\lambda}\right)$$

The set of calibration parameters Y can then be used in subsequent simulations of the photo-lithographic process, such as simulations of a wafer pattern at the arbitrary focal plane of the photo-lithographic system based on an illuminated mask pattern at an object plane of the photo-lithographic system and a model of the optical path in the photo lithographic system.

A wide variety of fitting techniques may be used when determining the interpolation functions, for example, the least squares fitting or non-linear fitting techniques (such as a Levenberg-Marquardt least-squares minimization technique). Moreover, many different interpolation functions may be used, such as cubic splines, polynomials, ortho-normal functions, and the like. In an exemplary embodiment, the interplation function is a quadratic function, i.e.

$$Y = A_0 + A_1\left(\frac{\Delta f}{\lambda}\right) + A_2\left(\frac{\Delta f}{\lambda}\right)^2$$

where $A_0$ is a constant term which corresponds to an average of at least the three sets of calibration parameters, $A_1$ is the coefficient of the linear term, and $A_2$ is the coefficient of the quadratic term.

In one embodiment, measurements of variability such as LER or CD Uniformity (CDU) may be used to calibrate signal $\xi$ and the threshold Th. In another embodiment, measurements of defect count or pixNOK values, may be used to calibrate signal $\xi$ and threshold Th.

Parameter pixNOK is defined as:

$$pixNOK = \frac{\sum \text{pixels in failure}}{\sum \text{pixels inspected}}$$

The summation in the above expression is run over all inspected spaces from all inspected images. The value of pixNOK may be expressed in terms of parts per million (ppm), parts per billion (ppb), and the like.

Distances that are offset to the threshold for the formation or clearing of a mask feature are represented herein as positive constants $\Delta d$ and $\Delta b$, which are respectively indicative of the decrease and increase in the signal intensity at offsets $\Delta d$ and $\Delta b$ from the threshold. Given calibrated signal $\xi$ user selected offset distances $\Delta d$ and $\Delta b$, and calibrated threshold Th, contour signals $C_{const}^d$ and $C_{const}^b$ associated with threshold values (Th−$\Delta d$) and (T+$\Delta b$) are the constructed. In one embodiment, contour signals $C_{const}^d$ and $C_{const}^b$ are thereafter calibrated from the same data used to calibrate signal and threshold Th. Contour signals $C_{const}^d$ and $C_{const}^b$ may be calibrated from the mask and wafer test pattern error bands, or from test pattern error bands computed using a rigorous model. Calibrated contour signals $C_{const}^d$ and $C_{const}^b$ are subsequently used as the stochastic signal contour, as described further below.

Next, a calibrated kernel function, represented herein as $K_{corr}$ is selected. The kernel may be calibrated using the same data set obtained either from the measurements made on corresponding masks/wafers, or from a rigorous model used to calibrate signal $\xi$ and threshold Th. The Kernel function is selected so as to have the following properties: (i) near-zero value at relatively large distances, (ii) a volume of unity; and (iii) real and non-negative values for all domains in which it is defined. For example, for a 5-nm process node, a distance above 15 nm is considered as relatively large. The kernel, which is adapted to account for interactions between neighboring patterns, may be characterized by any of the following distribution functions, namely Gaussian, Lorentzian, Cauchy, Voigt, sphere, disc, or a linear combination of any of such distribution functions.

In accordance with one embodiment of the present disclosure, the stochastic signal $\xi_{corr}$ derived by convolving signals $\xi$ and $K_{corr}$ predicts where an edge is likely to form and provides a stochastic variance band around the edges, as shown below:

$$\xi_{corr} = \xi \otimes K_{corr} \quad (2)$$

where $\otimes$ represents the convolution operation.

Figure 2:
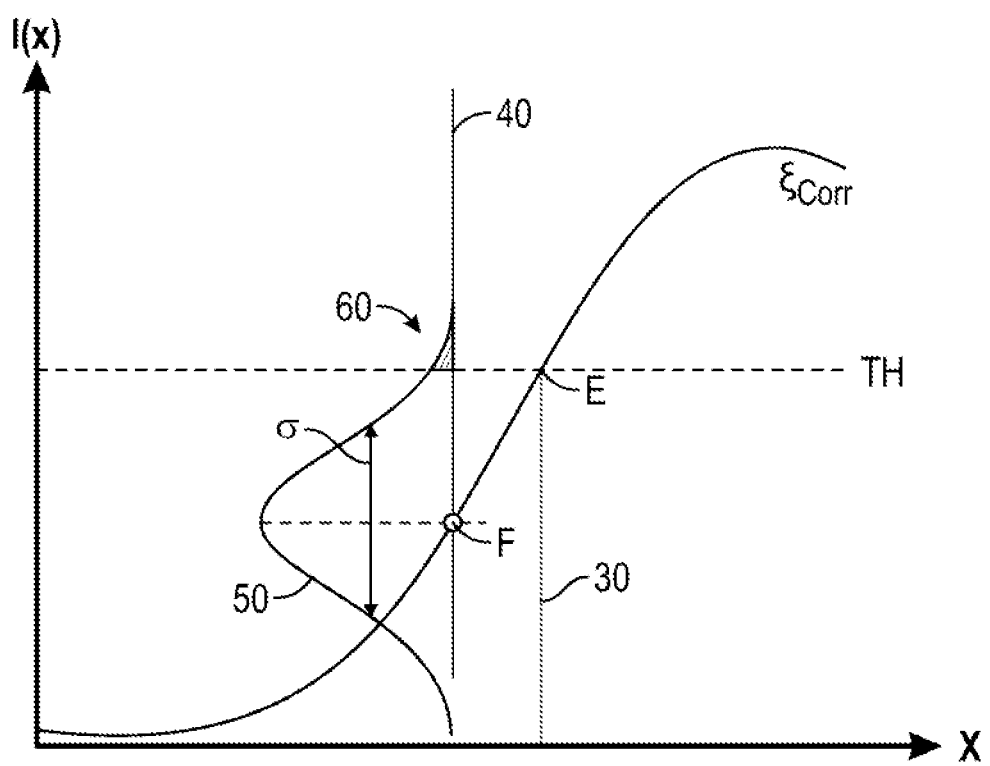
FIG. 2 shows a continuous stochastic signal used in predicting edge formation on a wafer, in accordance with one embodiment of the present disclosure.

FIG. 2 shows the intensity as a function of distance associated with an exemplary stochastic signal $\xi_{corr}$ assumed to have a Gaussian distribution. Also shown in FIG. 2 is a threshold value TH selected as described above. Photo resist edges are predicted as forming in the region positioned to the right of vertical line 30 that crosses point E, i.e., the point at which signal $\xi_{corr}$ and the TH line intersect.

The probability of forming an edge at point F, i.e., the point at which signal $\xi_{corr}$ and a resist model defined by vertical line 40 intersect, is determined by the area of region 60 of Gaussian distribution 50 shown as having a mean value of $\mu$ and a standard deviation of $\sigma$. As is seen, region 60 is shown as being outside the $\pm\sigma$ range.

The value of $\sigma$ depends on a number of factors such as the dose, the photoresist absorption (abs) coefficient, secondary electron yield (SEY), Acid concentration ($C_A$), acid yield (AY), quencher concentration ($C_Q$), post-exposure bake (PEB) enhancement factor $K_{PEB}$, and a constant representing dark loss, as shown below:

$$\sigma^2 \approx K_{PEB} \times (\text{dose} \times \text{abs} \times \text{SEY} \times C_A \times \text{AY} - C_Q + \text{contstant}) \quad (3)$$

For any given process, the above expression (3) may be simplified as a linear expression with parameters a and b as shown below:

$$\alpha^2 \approx a \times \text{dose} + b \quad (4)$$

Parameter a has a positive value, and parameter b may have a positive or a negative value that may obtained empirically. Assume that a Gaussian distribution associated with a random variable X has a mean of $\mu$, and a standard deviation of $\sigma$, i.e., $X \sim N(\mu,\sigma^2)$. To determine the probability P(x) of forming an edge at any position x, in accordance with one embodiment of the present disclosure, the optical intensity measure is converted to a corresponding number of photons.

For an open frame exposure, the conversion from light intensity to a photon count may be achieved by multiplying the intensity with a scalar factor and applying a correlation factor, represented herein as $k_p$, to account for any effect that a local voxel (three-dimensional pixel) may have on a nearby voxel. Accordingly, for the points above the threshold, P(x) may be defined as:

$$P(x) = 1 - \frac{1}{2}\left(1 + \text{erf}\left(\frac{X - \mu}{\sigma\sqrt{2}}\right)\right) \quad (5)$$

P(x) may be simplified as:

$$P(x) = \frac{1}{2} - \text{erf}\left(\frac{k_p \times Th - k_p \times I(x)}{\sqrt{2}\left(k_c\sqrt{k_p \times \xi_{corr}} + C'\right)}\right) \quad (6)$$

where $k_c$ represents a scaling parameter and C' represents a constant. For all the points above the threshold, P(x) may further be simplified as:

$$P(x) = \frac{1}{2} - \text{erf}\left(\frac{Th - \xi_{corr}}{\sqrt{a \times \xi_{corr}} + b}\right) \quad (7)$$

As is seen from the above expression (7), in accordance with one aspect of the present disclosure, the probability distribution function of forming an edge at point x is determined by a defined threshold value Th, signal $\xi_{corr}$ described above. and parameters a and b, also described above. It is understood that erf(.) represents an error function. For points below the threshold, the probability P(x) of forming an edge may be written as:

$$P(x) = \frac{1}{2} + \text{erf}\left(\frac{Th - \xi_{corr}}{\sqrt{a \times \xi_{corr}} + b}\right) \quad (8)$$

Figure 3:
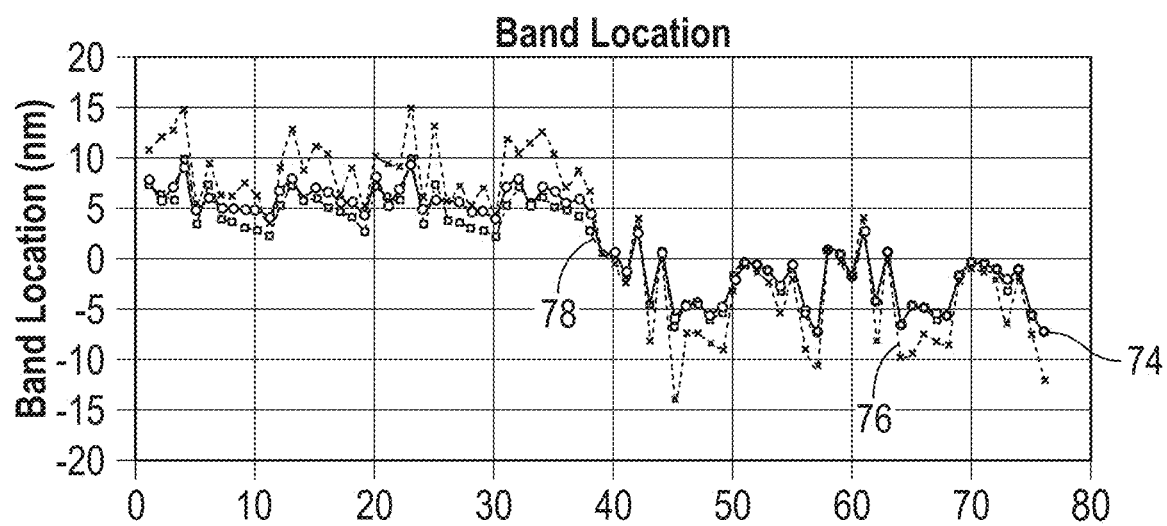
FIG. 3 shows the stochastic error band associated with the signal of FIG. 2, in accordance with one embodiment of the present disclosure.

FIG. 3 shows exemplary variance bands obtained for various locations on a wafer using different model. Plot 74 (identified using circles) was obtained using a rigorously calibrated model. A rigorous model, as is known, is computationally intensive, time consuming and considered to be accurate. Plot 76 (identified using crosses) was obtained using a conventional model. Plot 78 (identified using rectangles) is obtained in accordance with embodiments of the present disclosure. As is seen from FIG. 3, plot 78 matches plot 74 more closely than does plot 76.

Figure 4:
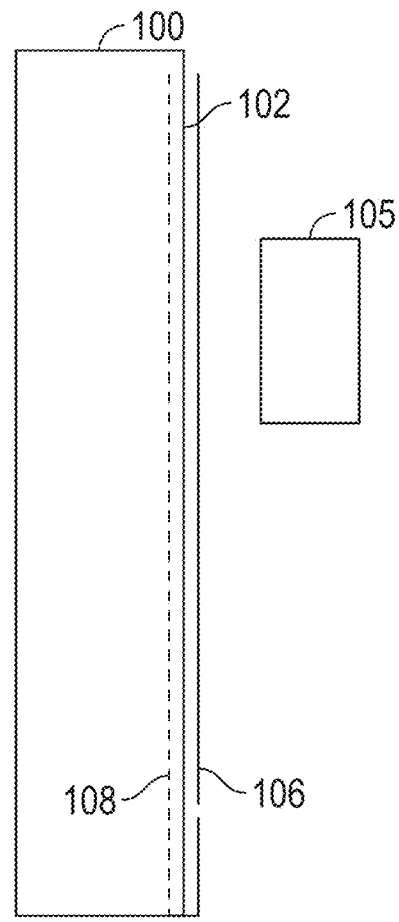
FIG. 4 shows an assist feature used to change the stochastic band of a neighboring edge of a pattern, in accordance with one embodiment of the present disclosure.

A stochastic model as represented by signal $\xi_{corr}$ and determined in accordance with the embodiments of the present disclosure, may be used to optimize mask patterns and optical source characteristics, thereby to reduce defects in a wafer to which the mask patterns are transferred. For example, in one embodiment, the stochastic model may be used to change the dose or focus of the optical instrument during the mask pattern transfer. In another embodiment, the stochastic model may be used to define the photoresist characteristics used to form a pattern on a wafer. In yet other embodiments, an assist feature may be used to cause a change in the variance band of an edge. FIG. 4 shows a mask pattern 100 to be transferred to a wafer. Assume that the variance band associated with edge 102 of pattern 100, as determined and described above with reference to embodiments of the present disclosure, falls within lines 106 and 108. To narrow this band when pattern 100 is formed on a wafer, in one embodiment, assist feature 105 is formed near pattern 100 on the mask and transferred to the wafer.

To determine a possible defect associated with a gauge, in accordance with one embodiment of the present disclosure, signal ξs as defined in expression (2) is determined. A defect is understood herein to refer to a stochastic defect rate having contours that fall outside a pre-defined range of acceptable limits. Such defects are associated with photon shot noise and molecular stochastic effect and may be calibrated. For example, assume a contour at a location x and associated with a process for which the variable that cause defects are the photon shot noise and stochastic molecular effects. Assume further that the acceptable process variation limit for the contour is x±ϵ, and that in one instance the contour is printed on the mask at location x+δx. Accordingly, a defect is known to exist at such a location δx>ϵ.

Such a defect $D_{gauge}$ may be computed as shown below:

$$D_{gauge} = \iint_{-defect\ range}^{+defect\ range} \xi_s dA \quad (9)$$

The defect range defined by parameters ±defect range starts and ends at positions defined by the user. The defect range may specify the probability, distance or the percentage change in edge placement or CD variation. Computed values of $D_{gauge}$ are further tunable via measured calibration data or used for verification against rigorously simulated data. The measure could be used for repeating patterns like lines and spaces, contact holes, cut lines, or more generalized two-dimensional field and areas.

In accordance with one embodiment of the present disclosure, the Logarithm of the defect rate within a region of a wafer may be determined by the CD measurements obtained from signal $\xi_{torr}$ as shown below:

$$\text{Log(defect rate)} \propto \text{CD from } \xi_{corr} \quad (10)$$

In other words, the CD obtained from the stochastic variable band associated with signal $\xi_{corr}$ may be used, in accordance with one embodiment of the present disclosure, to predict the defect rate.

Figure 5:
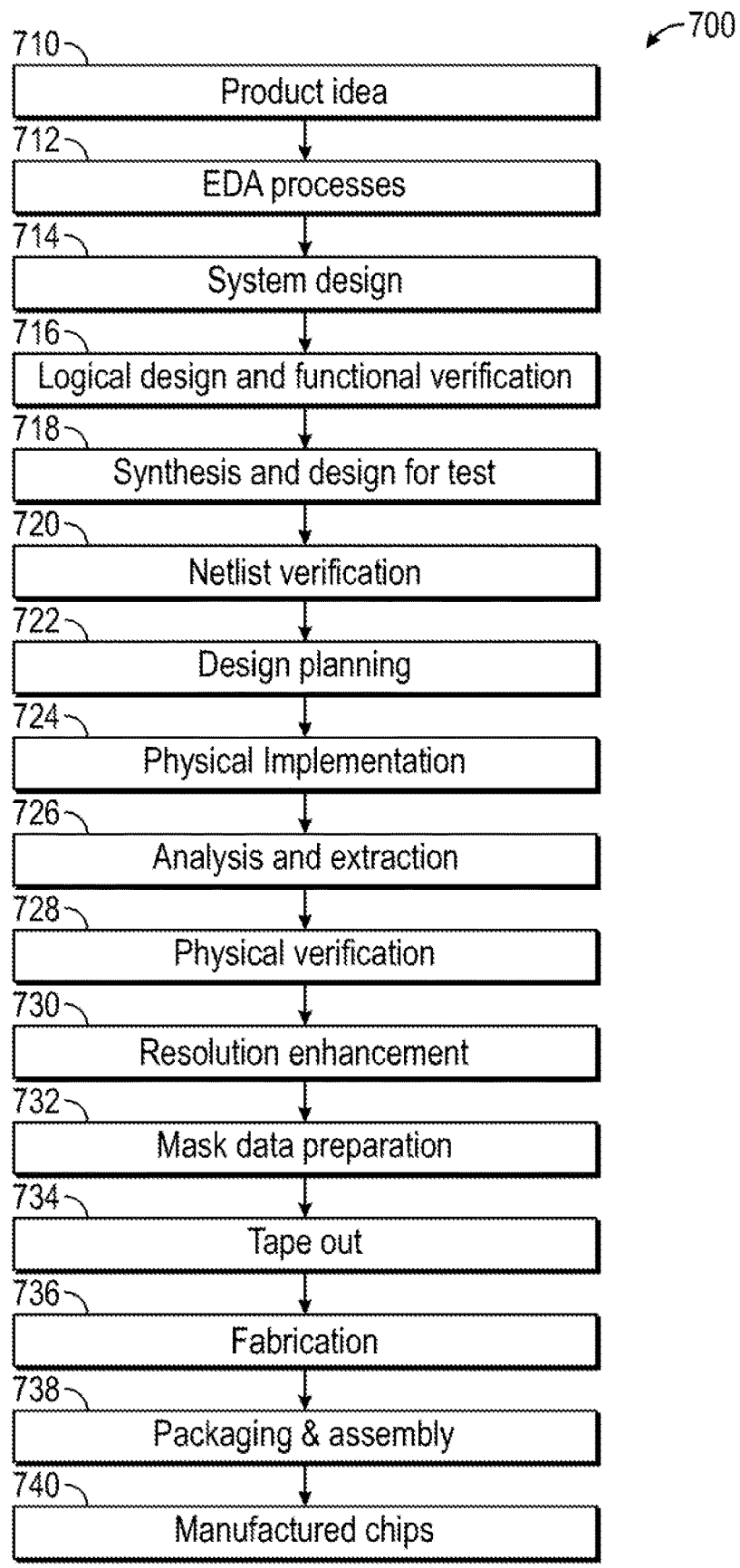
FIG. 5 shows a flowchart of various processes used during the design and manufacture of an integrated circuit, in accordance with some embodiments of the present disclosure.

FIG. 5 illustrates an example set of processes 700 used during the design, verification, and fabrication of an article of manufacture such as an integrated circuit to transform and verify design data and instructions that represent the integrated circuit. Each of these processes can be structured and enabled as multiple modules or operations. The term 'EDA' signifies the term 'Electronic Design Automation.' These processes start with the creation of a product idea 710 with information supplied by a designer, information which is transformed to create an article of manufacture that uses a set of EDA processes 712. When the design is finalized, the design is taped-out 734, which is when artwork (e.g., geometric patterns) for the integrated circuit is sent to a fabrication facility to manufacture the mask set, which is then used to manufacture the integrated circuit. After tape-out, a semiconductor die is fabricated 736 and packaging and assembly processes 738 are performed to produce the finished integrated circuit 740.

Specifications for a circuit or electronic structure may range from low-level transistor material layouts to high-level description languages. A high-level of representation may be used to design circuits and systems, using a hardware description language ('HDL') such as VHDL, Verilog, SystemVerilog, SystemC, MyHDL or OpenVera. The HDL description can be transformed to a logic-level register transfer level ('RTL') description, a gate-level description, a layout-level description, or a mask-level description. Each lower level representation of a design adds more useful detail into the design description, for example, more details for the modules that include the description. The lower levels representation of a design may be generated by a computer, derived from a design library, or created by another design automation process. An example of a specification language representative of a lower level description of a design is SPICE, which is used for detailed descriptions of circuits with many analog components. Descriptions at each level of representation are enabled for use by the corresponding tools of that layer (e.g., a formal verification tool). A design process may use a sequence depicted in FIG. 5. The processes described by be enabled by EDA products (or tools).

During system design 714, functionality of an integrated circuit to be manufactured is specified. The design may be optimized for desired characteristics such as power consumption, performance, area (physical and/or lines of code), and reduction of costs, etc. Partitioning of the design into different types of modules or components can occur at this stage.

During logic design and functional verification 716, modules or components in the circuit are specified in one or more description languages and the specification is checked for functional accuracy. For example, the components of the circuit may be verified to generate outputs that match the requirements of the specification of the circuit or system being designed. Functional verification may use simulators and other programs such as testbench generators, static HDL checkers, and formal verifiers. In some embodiments, special systems of components referred to as 'emulators' or 'prototyping systems' are used to speed up the functional verification.

During synthesis and design for test 718, HDL code is transformed to a netlist. In some embodiments, a netlist may be a graph structure where edges of the graph structure represent components of a circuit and where the nodes of the graph structure represent how the components are interconnected. Both the HDL code and the netlist are hierarchical articles of manufacture that can be used by an EDA product to verify that the integrated circuit, when manufactured, performs according to the specified design. The netlist can be optimized for a target semiconductor manufacturing technology. Additionally, the finished integrated circuit may be tested to verify that the integrated circuit satisfies the requirements of the specification.

During netlist verification 720, the netlist is checked for compliance with timing constraints and for correspondence with the HDL code. During design planning 722, an overall floor plan for the integrated circuit is constructed and analyzed for timing and top-level routing.

During layout or physical implementation 724, physical placement (positioning of circuit components such as transistors or capacitors) and routing (connection of the circuit components by multiple conductors) occurs, and the selection of cells from a library to enable specific logic functions can be performed. As used herein, the term 'cell' may specify a set of transistors, other components, and interconnections that provides a Boolean logic function (e.g., AND, OR, NOT, XOR) or a storage function (such as a flipflop or latch). As used herein, a circuit 'block' may refer to two or more cells. Both a cell and a circuit block can be referred to as a module or component and are enabled as both physical structures and in simulations. Parameters are specified for selected cells (based on 'standard cells') such as size and made accessible in a database for use by EDA products.

During analysis and extraction 726, the circuit function is verified at the layout level, which permits refinement of the layout design. During physical verification 728, the layout design is checked to ensure that manufacturing constraints are correct, such as DRC constraints, electrical constraints, lithographic constraints, and that circuitry function matches the HDL design specification. During resolution enhancement 730, the geometry of the layout is transformed to improve how the circuit design is manufactured.

During tape-out, data is created to be used (after lithographic enhancements are applied if appropriate) for production of lithography masks. During mask data preparation 732, the 'tape-out' data is used to produce lithography masks that are used to produce finished integrated circuits.

A storage subsystem of a computer system (such as computer system 900 of FIG. 6, or host system 807 of FIG. 5) may be used to store the programs and data structures that are used by some or all of the EDA products described herein, and products used for development of cells for the library and for physical and logical design that use the library.

Figure 6:
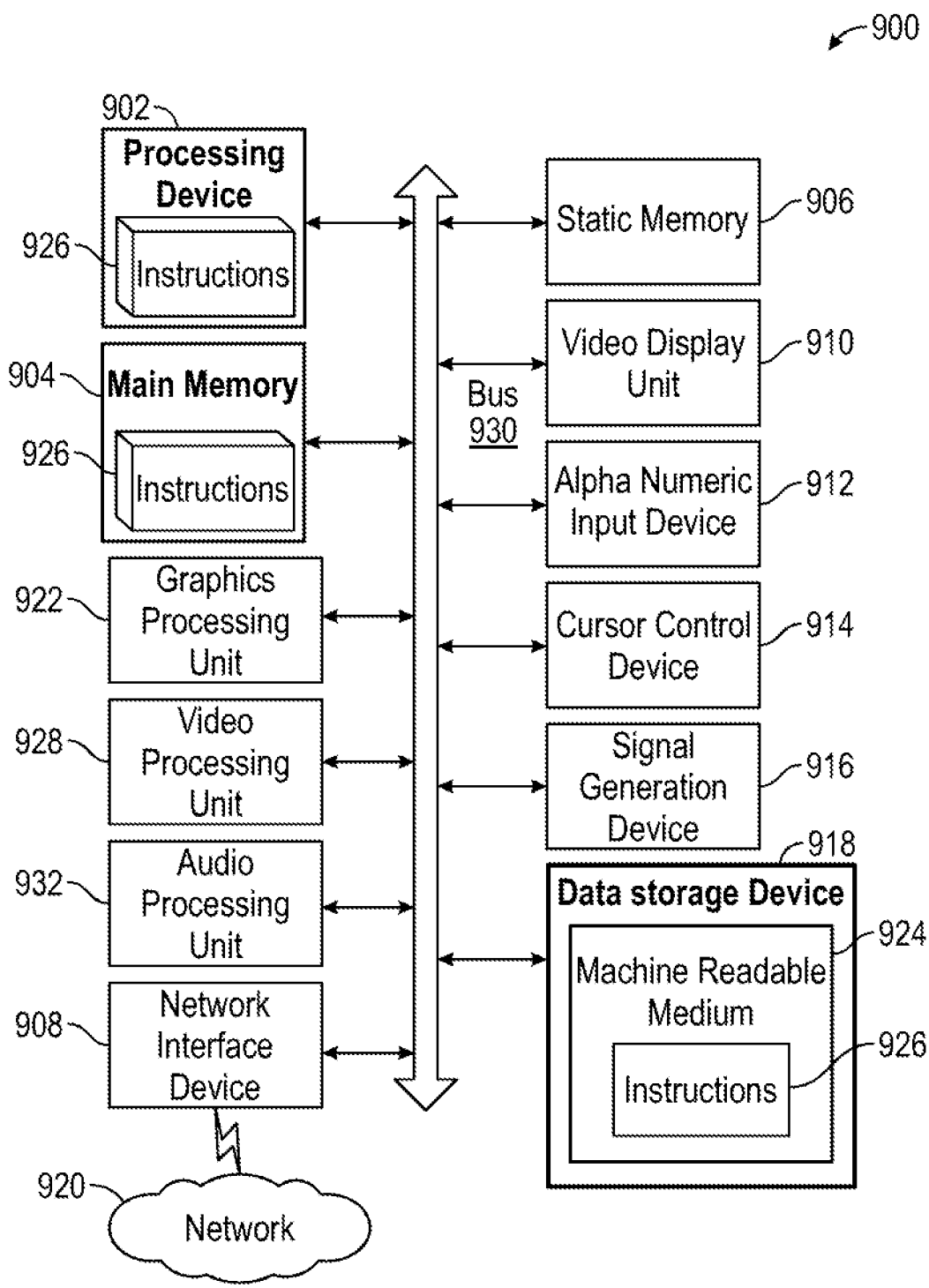
FIG. 6 shows a diagram of an example of a computer system in which embodiments of the present disclosure may operate.

FIG. 6 illustrates an example machine of a computer system 900 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 900 includes a processing device 902, a main memory 904 (e.g., read-only memory (ROM), flash memory, dynamic random access memory (DRAM) such as synchronous DRAM (SDRAM), a static memory 906 (e.g., flash memory, static random access memory (SRAM), etc.), and a data storage device 918, which communicate with each other via a bus 930.

Processing device 902 represents one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 902 may also be one or more special-purpose processing devices such as an application specific integrated circuit (ASIC), a field programmable gate array (FPGA), a digital signal processor (DSP), network processor, or the like. The processing device 902 may be configured to execute instructions 926 for performing the operations and steps described herein.

The computer system 900 may further include a network interface device 908 to communicate over the network 920.

The computer system 900 also may include a video display unit 910 (e.g., a liquid crystal display (LCD) or a cathode ray tube (CRT)), an alphanumeric input device 912 (e.g., a keyboard), a cursor control device 914 (e.g., a mouse), a graphics processing unit 922, a signal generation device 916 (e.g., a speaker), graphics processing unit 922, video processing unit 928, and audio processing unit 932.

The data storage device 918 may include a machine-readable storage medium 924 (also known as a non-transitory computer-readable medium) on which is stored one or more sets of instructions 926 or software embodying any one or more of the methodologies or functions described herein. The instructions 926 may also reside, completely or at least partially, within the main memory 904 and/or within the processing device 902 during execution thereof by the computer system 900, the main memory 904 and the processing device 902 also constituting machine-readable storage media.

In some implementations, the instructions 926 include instructions to implement functionality corresponding to the present disclosure. While the machine-readable storage medium 924 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine and the processing device 902 to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

What is claimed:

1. A method comprising:
    defining a continuous signal;
    defining a threshold value;
    calibrating the continuous signal and the threshold value from measurements made on edges of one or more patterns on a mask and corresponding edges of the one or more patterns on a wafer;
    convolving the continuous signal with a kernel to form a corrected signal, the kernel calibrated using the measurements; and
    establishing, by a processor, a probability of forming an edge at a point along the corrected signal in accordance with a difference between a value of the corrected signal at the point and the calibrated threshold value.

2. The method of claim 1 further comprising:
    changing a dose of an optical source prior to a transfer of the one or more mask patterns to the wafer in accordance with the corrected signal.

3. The method of claim 1 further comprising:
    changing a depth of focus of an optical source prior to a transfer of the one or more mask patterns to the wafer in accordance with the corrected signal.

4. The method of claim 1 further comprising:
changing a characteristic of the photoresist prior to a transfer of the one or more mask patterns to the wafer in accordance with the corrected signal.

5. The method of claim 1 further comprising:
adding one or more features to the mask prior to a transfer of the one or more mask patterns to the wafer in accordance with the corrected signal.

6. The method of claim 1 wherein the kernel is characterized by near-zero value at distances that are at least twice the minimum dimension supported by an instrument generating an extreme ultraviolet (EUV) exposure or a deep ultraviolet (EUV) exposure, wherein the kernel is further characterized by a volume of unity, and real and non-negative values for domains in which the kernel is defined.

7. The method of claim 1 further comprising:
determining a first contour of the corrected signal at a first offset distance from the threshold value at which an intensity of an extreme ultraviolet (EUV) exposure is higher than an intensity of the EUV exposure at the threshold distance;
determining a second contour of the corrected signal at a second offset distance from the threshold value at which an intensity of the EUV exposure is smaller than the intensity of the EUV exposure at the threshold distance;
determining a stochastic variance band from the first and second contours; and
changing either a dose or a depth of focus of an optical source prior to a transfer of the one or more mask patterns to the wafer in accordance with the stochastic variance band.

8. The method of claim 7 wherein the probability of forming an edge at any point along an x-axis is defined by:

$$P(x) = \frac{1}{2} + \text{erf}\left(\frac{Th - \xi_{corr}}{\sqrt{a \times \xi_{corr}} + b}\right)$$

where Th represents the threshold value, $\xi_{corr}$ represents the corrected signal, a and b are scaling coefficients, and erf represents an error function.

9. The method of claim 1 wherein the measurements are made from a rigorous optical simulation model.

10. The method of claim 1 wherein the measurements are physical measurements made on the mask and the wafer.

11. A non-transitory computer readable storage medium comprising instructions which when executed by a processor cause the processor to:
define a continuous signal;
define a threshold value;
calibrate the continuous signal and the threshold value from measurements made on edges of one or more patterns on a mask and corresponding edges of the one or more patterns on a wafer;
convolve the continuous signal with a kernel to form a corrected signal, the kernel calibrated using the measurements; and
establish an edge at a point along the corrected signal in accordance with a difference between a value of the corrected signal at the point and the calibrated threshold value.

12. The non-transitory computer readable storage medium of claim 11 wherein the instructions further cause the processor to:
change a dose of an optical source prior to a transfer of the one or more mask patterns to the wafer in accordance with the corrected signal.

13. The non-transitory computer readable storage medium of claim 11 wherein the instructions further cause the processor to:
change a depth of focus of an optical source prior to a transfer of the one or more mask patterns to the wafer in accordance with the corrected signal.

14. The non-transitory computer readable storage medium of claim 11 wherein the instructions further cause the processor to:
adding one or more features to the mask prior to a transfer of the one or more mask patterns to the wafer in accordance with the corrected signal.

15. The non-transitory computer readable storage medium of claim 11 wherein the kernel is characterized by near-zero value at distances that are at least twice the minimum dimension supported by an instrument generating an extreme ultraviolet (EUV) exposure or a deep ultraviolet (EUV) exposure, wherein the kernel is further characterized by a volume of unity, and real and non-negative values for domains in which the kernel is defined.

16. The non-transitory computer readable storage medium of claim 11 wherein the instructions further cause the processor to:
determine a first contour of the corrected signal at a first offset distance from the threshold value at which an intensity of the an extreme ultraviolet (EUV) exposure exposure is higher than an intensity of the EUV exposure at the threshold distance;
determine a second contour of the corrected signal at a second offset distance from the threshold value at which an intensity of the EUV exposure is smaller than the intensity of the EUV exposure at the threshold distance;
determine a stochastic variance band from the first and second contours; and
change either a dose or a depth of focus of an optical source prior to a transfer of the one or more mask patterns to the wafer in accordance with the stochastic variance band.

17. A system comprising:
a memory storing instructions; and
a processor, coupled with the memory and to execute the instructions, the instructions when executed causing the processor to:
define a continuous signal;
define a threshold value;
calibrate the continuous signal and the threshold value from measurements made on edges of one or more patterns on a mask and corresponding edges of the one or more patterns on a wafer;
convolve the continuous signal with a kernel to form a corrected signal, the kernel calibrated using the measurements; and
establish an edge at a point along the corrected signal in accordance with a difference between a value of the corrected signal at the point and the calibrated threshold value.

18. The system of claim 17 wherein the system further causes the processor to:
change a dose of an optical source prior to a transfer of the one or more mask patterns to the wafer in accordance with the corrected signal.

19. The system of claim 17 wherein the system further causes the processor to:
    change a depth of focus of an optical source prior to a transfer of the one or more mask patterns to the wafer in accordance with the corrected signal.

20. The system of claim 17 wherein the system further causes the processor to:
    add one or more features to the mask prior to a transfer of the one or more mask patterns to the wafer in accordance with the corrected signal.

* * * * *